United States Patent [19]

Tsujimoto

[11] Patent Number: 5,568,523

[45] Date of Patent: Oct. 22, 1996

[54] METHOD AND APPARATUS FOR ADAPTIVELY CANCELING INTERFERENCE SIGNALS

[75] Inventor: Ichiro Tsujimoto, Tokyo, Japan

[73] Assignee: NEC Corporation, Japan

[21] Appl. No.: 241,629

[22] Filed: May 12, 1994

[30] Foreign Application Priority Data

Jun. 29, 1993 [JP] Japan ................................ 5-210813

[51] Int. Cl.$^6$ ................................................ H04B 7/10
[52] U.S. Cl. ........................ 375/347; 375/267; 455/137; 455/138; 455/303
[58] Field of Search ........................... 375/267, 299, 375/346, 347, 349; 455/52.3, 65, 67.6, 70, 101, 132, 133, 136, 137, 138, 140, 296, 303

[56] References Cited

U.S. PATENT DOCUMENTS

| | | | |
|---|---|---|---|
| 5,239,698 | 8/1993 | Dejmek et al. | 455/136 |
| 5,297,171 | 3/1994 | Koch | 375/347 |
| 5,406,588 | 4/1995 | Birchler et al. | 375/346 |
| 5,440,590 | 8/1995 | Birchler et al. | 375/347 |
| 5,487,091 | 1/1996 | Jasper et al. | 375/347 |

OTHER PUBLICATIONS

"The Power–Inversion Adaptive Array: Concept and Performance", by R. T. Compton, Jr., IEEE Transactions on Aerospace and Electronic Systems, vol. AES–15, No. 6, Nov. 1979, pp. 803–814.

Primary Examiner—Stephen Chin
Assistant Examiner—Amanda T. Le
Attorney, Agent, or Firm—Ostrolenk, Faber, Gerb & Soffen, LLP

[57] ABSTRACT

A method and an apparatus for adaptively canceling an interference signal in any D/U ratio is disclosed. The method and apparatus are directed to being implemented in a two-branch space-diversity system having an array of first and second receivers assigned to a first diversity branch and a second diversity branch, respectively. The feature resides in the ratio $$w_2/w_1 = (m_1 g_1 m_2 g_2^*) / (m_2^2 g_2 g_2^*),$$

wherein $w_1$ and $w_2$ are the weights by which a first branch signal and a second branch signal, respectively, are to be multiplied, $m_1$ and $m_2$ are the gains of the first and second receivers, and $g_1$ and $g_2$ are the transmission coefficients of the interference signals received by the first and second receiver, respectively.

8 Claims, 3 Drawing Sheets

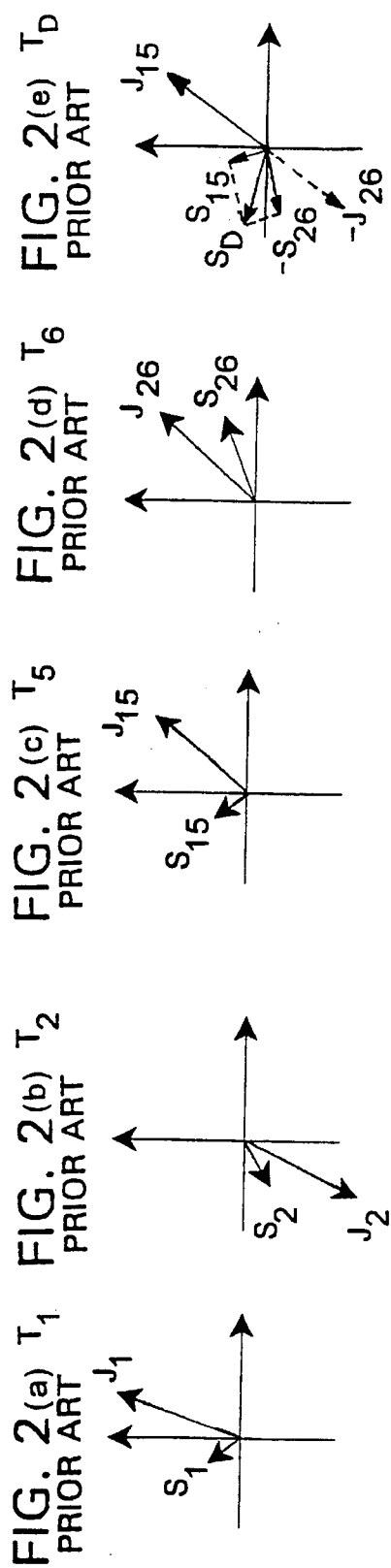
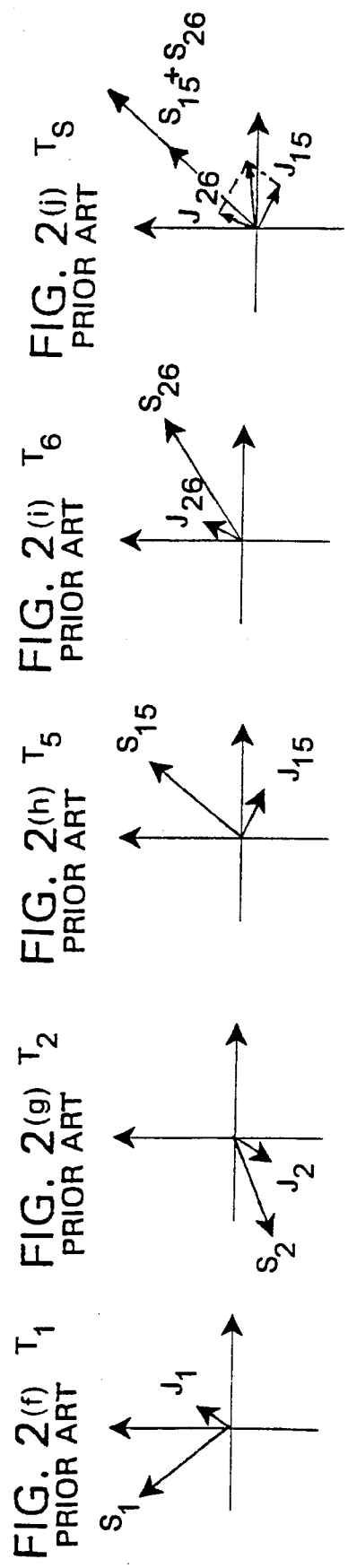

1

METHOD AND APPARATUS FOR ADAPTIVELY CANCELING INTERFERENCE SIGNALS

BACKGROUND OF THE INVENTION

1. Field of the Invention

The present invention relates to a method and an apparatus for adaptively canceling an interference signal, and particularly relates to a method and an apparatus capable of canceling wide-band interference signals of any D/U ratio (a desired to undesired signal ratio) ranging from the positive to the negative, adapted for a digital transmission system by means of space-diversity reception.

2. Description of the Related Art

In radio relay systems, for example, for mobile telephone communication and digital microwave communication, to which PSK, QAM, etc., are applied, FM interference or jamming signals which possibly come from an adjacent analog channel are, in most cases, regarded as narrow band signals. However, interference signals which are transmitted from a digital transmission line are generally wide-band interference signals. This latter tendency is particularly prominent in high-speed digital transmission.

While cancellation of the narrow-band interference signals can be effected rather easily by employing a conventional elimination method using a linear or nonlinear filter, it is generally difficult to eliminate the wide-band interference signals.

It is known, however, that specifically when the power level of the interference signal predominates that of a desired signal (the D/U ratio is negative), cancellation of the interference signal can be advantageously effected by means of the power-inversion adaptive array concept, according to which interference signals, even when the signals are of a wide-band, can be canceled by combining in inverted phases two interference signals included in the arrival signals received by a two-branch space-diversity system. This technique is presented by R. T. Compton, Jr. in his paper entitled, "The Power-Inversion Adaptive Array: Concept and Performance," IEEE TRANSACTIONS ON AEROSPACE AND ELECTRONIC SYSTEMS, VOL. AES-15, NO. 6 NOVEMBER 1979.

FIG. 1 is a block diagram of an interference canceling apparatus having a two-branch space-diversity signal-reception system directed to working the Compton concept.

AGC (automatic gain control) amplifiers 308,309 assigned to first and second branches, respectively, amplify arrival signals $T_1$, $T_2$ to a normalized power level, producing first and second branch signals $T_3$, $T_4$, respectively. A correlator 306 receives both branch signal $T_3$ and normalized output signal $T_N$ as a reference signal, generates a cross correlation coefficient between the two input signals and outputs the correlation coefficient as weight $w_1$ or a tap coefficient, wherein the normalized signal $T_N$ is produced by diversity combining and normalization by AGC, as will be described below. Similarly, correlator 307 generates a cross correlation coefficient between branch signal $T_4$ and normalized output signal $T_N$, and outputs weight $w_2$. We will now define "a correlation coefficient" in a complex expression. The correlation coefficient of any two complex quantities A and B is defined as a moving average of the product A*B over a sufficiently long time period, compared to a transmitted symbol duration of the desired signal S, so that a stable average value can be produced, and over a sufficiently short time period, compared to a fading duration on a transmission channel, so that the correlation coefficient can follow a channel fluctuation, and more precisely, so that the weights $w_1$ and $w_2$ provided from the correlater 306 and 307, respectively, can follow the transmission coefficients, $h_1$, $g_1$, $h_2$ and $g_2$, even when their amplitudes and phases vary randomly due to the fading. Multipliers 301, 302 multiply $T_3$, $T_4$ by weights $w_1$, $w_2$, respectively, thereby producing weighted branch signals $T_5$, $T_6$. An adder 303 adds the two weighted branch signals to effect diversity combining and produces sum signal $T_S$. An AGC amplifier 305 amplifies signal $T_S$ to a normalized power level, thereby producing normalized signal $T_N$. A subtractor 304 subtracts weighted branch signal $T_6$ from weighted branch signal $T_5$, thereby producing difference signal $T_D$. A selector 310 receives normalized output signal $T_N$ and difference signal $T_D$, and selectively outputs signal $T_N$ when the desired signal predominates the interference signal, and outputs signal $T_D$ when the interference signal is predominant over the desired signal. An equalizer 311 receives the output of the selector 310 and adaptively equalizes the received signal.

Before proceeding to the explanation of the operation of the apparatus shown in FIG. 1, several notations will be defined as follows:

$m_1$, $m_2$ automatic control gains of AGC amplifiers of the first and second branches, respectively, $h_1$, $h_2$ complex transmission coefficients for the desired signal representing the ratios of arrival desired signals $D_1$, $D_2$ at the first and second branches, respectively, to the transmitted desired signal S, i.e., $D_1=h_1 S$ and $D_2=h_2 S$, wherein arrival desired signals $D_1$, $D_2$ refer to desired signal components in complex expression included in arrival signals $T_1$, $T_2$, respectively, $g_1$, $g_2$ complex transmission coefficients for the interference signal representing the ratios of arrival interference signals $U_1$, $U_2$ at the first and second branches, respectively, to the interference signal J, i.e., $U_1=g_1 J$ $U_2=g_2 J$, wherein arrival interference signals $U_1$, $U_2$ refer to interference signal components in complex expression included in arrival signals $T_1$, $T_2$, respectively, and interference signal J refers to the signal as emitted from an interference signal source and E[A*B] correlation coefficient of quantity A with respect to quantity B as defined above.

In operation, it is assumed for simplicity that normalized output signal $T_N$ is initially $N_0^{-1}$ (S+J), wherein $N_0$ is a normalization constant to make the output power of AGC amplifier 305 equal to 1. Since branch signal $T_3$ is $$T_3 = m_1(h_1 S + g_1 J), \qquad (1)$$

weight $w_1$ generated by correlator 306 can be written $$\begin{aligned} w_1 &= E[T_3 * T_N] \\ &= N_0^{-1} (m_1 h_1 * S * S + m_1 g_1 * J * J) \end{aligned}, \qquad (2)$$

because a time average of a product of two uncorrelated quantities S*J or J*S gives zero. For simplicity, equation (2) may be rewritten $$w_1 = N_0^{-1}(m_1 h_1 * \sigma^2 + m_1 g_1 * \beta^2), \qquad (3)$$

wherein positive real numbers σ, β denote absolute values of S and J, respectively.

Thus, weighted branch signal $T_5$ is $$T_5 = N_0^{-1}(m_1^2 h_1 h_1^* \sigma^2 S + m_1^2 g_1 g_1^* \beta^2 J) + \qquad (4)$$
$$N_0^{-1}(m_1^2 h_1 g_1^* \beta^2 S + m_1^2 g_1 h_1^* \sigma^2 J)$$
$$= R_1 + C_1$$

wherein $R_1$ and $C_1$ denote the terms of the first and second parenthesis multiplied by $N_0^{-1}$, $R_1$ representing a phase-independent part with real coefficients of S and J, and $C_1$ representing a phase-dependent part with complex coefficients. Similarly, weighted branch signal $T_6$ is $$T_6 = N_0^{-1}(m_2^2 h_2 h_2^* \sigma^2 S + m_2^2 g_2 g_2^* \beta^2 J) + \qquad (5)$$
$$N_0^{-1}(m_2^2 h_2 g_2^* \beta^2 S + m_2^2 g_2 h_2^* \sigma^2 J)$$
$$= R_2 + C_2$$

The sum of weighted branch signals is amplified by the AGC amplifier 305 to provide normalized output signal $T_N$ which is fed back to the correlators 306, 307 to cause the second loop-operation to be performed. In this way, recursive operations of the feed-back loop are iterated.

It should be noted that in the output of the adder 303, only the sum of the in-phase parts $R_1$, $R_2$ is effective. The reason for this is that since the terms in $R_1$ and $R_2$ have real coefficients, each of signals S and J included in $R_1$ and $R_2$ is combined in phase, with the result that the effect of the sum $R_1+R_2$ is accumulated as the feed-back operation is iterated. Conversely, since the terms in $C_1$ and $C_2$ have phase-dependent (complex) coefficients, signals S and J included in $C_1$ and $C_2$ are individually added in random phase with the result that the maximal ratio combining effect of $C_1+C_2$ is not attained as long as $C_1$ and $C_2$ have different phases from each other. For this reason, the phase-dependent part may generally be ignored from the output of the adder 303 after many iterations of feedback operation.

Based on the above argument, it follows that, for the first loop operation, $$T_S = N_0^{-1}(m_1^2 h_1 h_1 \times \sigma^2 + m_2^2 h_2 h_2 \sigma^2)S + \qquad (6)$$
$$N_0^{-1}(m_1^2 g_1 g_1^* \beta^2 + m_2^2 g_2 g_2^* \beta^2)J +$$
$$\text{(phase-dependent term)}$$
$$= N_0^{-1}(pS + qJ) + \text{(phase-dependent term)}$$

which causes the output of the AGC amplifier 305 to be $$T_N = N_1^{-1}\{(pS+qJ)+\text{(phase-dependent term)}\} \qquad (7)$$

wherein $$p = m_1^2 h_1 h_1^* \sigma^2 + m_2^2 h_{22}^* \sigma^2, \qquad (9)$$

$$q = m_1^2 g_1 g_1^* \beta^2 + m_2^2 g_2 g_2^* \beta^2, \qquad (10)$$

and $N_1^{-1}$ denotes the normalization constant to normalize the power of signal $T_N$.

Thus, normalized signal $T_N$ produced after n-time feedback operations is $$T_N = N_n^{-1}(p^n S + q^n J), \qquad (11)$$

wherein $N_n$ is again the normalization constant to normalize the power of signal $T_N$. In equation (11), the ratio of the coefficient of S-term to that of J-term is $$r = (p/q)^n \qquad (12)$$

Accordingly, if the powers of the arrival desired signals $h_1 h_1^* \sigma^2$, $h_2 h_2^* \sigma^2$ are predominant over those of the arrival interference signals $g_1 g_1^* \beta^2$, $g_2 g_2^* \beta^2$, respectively, then the inequality $p>q$ holds, as is known from equations (9) and (10). In this case, the desired signal component included in the normalized signal $T_N$ grows more predominant over the interference signal component as the number n of feedback increases. That is, normalized signal $T_N$ corresponds to the maximal ratio combined signal between the diversity branches when the power of the desired signal overcomes that of the intereference signal. The selector 310 connects the normalized output signal $T_N$ to the equalizer 311.

If the powers of the arrival interference signals surpass those of the arrival desired signals, then the interference signal component of $T_N$ becomes predominant, and difference signal $T_D$ is connected to the equalizer 311. In this case, the strong interference signal is effectively canceled in favor of the weak desired signal, as will be described with reference to FIG. 2.

FIG. 2 represents vector diagrams to intuitively illustrate the operation of the apparatus shown in FIG. 1. In FIG. 2, (a) through (e) represent the case in which the interference signal is stronger than the desired signal. This condition is represented by $\beta > \sigma$. For simplicity, we assume that the terms including $\sigma$ are negligibly small.

As is easily derived from equation (11), weighted branch signal $T_5$ is, after n-time feedback operations, $$T_5 = N_n^{-1}(p^n m_1^2 h_1 h_1^* \sigma^2 S + q^n m_1^2 g_1 g_1^* \beta^2 J) + N_n^{-1}(q^n m_1^2 h_1 g_1^* \beta^2 S + p^n m_1^2 g_1 h_1^* \sigma^2 J). \qquad (13)$$

Ignoring the terms including $\sigma$ gives $$T_5 = N_n^{-1} q^n m_1 g_1^* \beta^2 (m_1 h_1 S) + \qquad (14)$$
$$N_n - 1 q^n m_1 g_1^* \beta^2 (m_1 g_1 J)$$
$$= N_n^{-1} q_n m_1 g_1^* \beta^2 \cdot S_1 + N_n^{-1} q^n m_1 g_1^* \beta^2 \cdot J_1$$
$$= S_{15} + J_{15},$$

wherein $S_1$ and $J_1$ denote the desired and interference signal components included in branch signal $T_3$, respectively, and $S_{15}$ and $J_{15}$ represent the desired and interference signal components, respectively, included in weighted branch signal $T_5$.

As can be seen in equation (14), the coefficients of $S_1$ and $J_1$ are equal to each other and $g_1^*$ is a single complex number included in the coefficients. This means that the phase angle between $S_{15}$ and $S_1$ is equal to the phase angle between $J_{15}$ and $J_1$, and accordingly the angle between $S_1$ and $J_1$ is equal to that between $S_{15}$ and $J_{15}$ (cf. FIG. 2(a) and (c)). In addition, since the coefficient of J included in $J_{15}$ ($=N_n^{-1} q^n m_1^2 g_1 g_1^* \beta^2$) is a real number, the direction of $J_{15}$ in the phase space should be parallel to the direction of J, i.e., $J_{15}$ should have the same phase as J.

Similarly, the angle between the desired and interference components $S_2$ and $J_2$ in branch signal $T_4$ is equal to the angle between the desired and interference components $S_{26}$ and $J_{26}$ (cf. FIG. 2(b), (d)), and $J_{26}$ is parallel to J, wherein $S_{26}$ and $J_{26}$ refer to the desired and interference signal components, respectively, included in weighted branch signal $T_6$. Thus, $J_{15}$ and $J_{26}$ are parallel to each other. As a result, the two interference components are combined in inverted phase by subtractor 304 (cf. FIG. 2(e)), whereby effective compensation is effected. On the other hand, the two desired signal components $S_{15}$, $S_{26}$ are not equidirectional to each other, i.e. they have uncorrelated phases. Accordingly, the absolute value of the resultant desired signal $S_D$ resulted from vector subtraction $S_{15}-S_{26}$ is not always less than the absolute value of the component signal $S_{15}$ or $S_{26}$, as is shown in FIG. 2(e). In this way, the strong interference signal is effectively canceled in favor of the weak desired signal, thereby allowing the power ratio of the desired signal and interference signal to be inverted.

FIG. 2(f) through (j) shows the case in which the desired signal is stronger than the interference signal. In the figure, $S_1$ and $S_2$ denote the desired signal components included in branch signal $T_3$ and $T_4$, respectively, and $J_1$ and $J_2$ denote the interference signal components included in branch signal $T_3$ and $T_4$, respectively. In this case, we assume that $\beta$ is negligibly small. Based on this assumption, it follows that the phase angle between $S_1$ and $J_1$ is equal to the phase angle between $S_{15}$ and $J_{15}$ (cf. FIG. 2(f), (h)), and the phase angle between $S_2$ and $J_2$ is equal to the phase angle between $S_{26}$ and $J_{26}$ (cf. FIG. 2(g), (i)). It follows, furthermore, that both of the desired signal components $S_{15}$ and $S_{26}$ are parallel to (have the same phase as) the desired signal S, as $J_{15}$ and $J_{26}$ were parallel to J in the preceding case. For this reason, effective in-phase combination of $S_{15}$ and $S_{16}$ can be effected by the adder 303, as shown in FIG. 2(j). Interference signal components $J_{15}$ and $J_{26}$, on the other hand, direct to different orientations (have different phases). Consequently, the adder 303 effects combining of the two interference signal components $J_{15}$, $J_{26}$ in uncorrelated phases. In this way, the adder 303 acts in favor of the strong desired signal, although the interference signal is left uncanceled.

As described above, in the prior art interference-signal canceling apparatus, while the interference signal can be effectively canceled in the case of a negative D/U ratio, there remains the drawback that, in the case of a positive D/U ratio, effective combining of the desired signal causes the interference signal to be left uncanceled, and cancellation of the interference signal causes the desired signal also to be canceled.

SUMMARY OF THE INVENTION

It is an object of the present invention to provide a method of canceling wide-band interference signals in any D/U ratio.

It is another object of the present invention to provide an apparatus for canceling wide-band interference signals in any D/U ratio.

In order to attain the first object above, the method of adaptively canceling an interference signal according to the present invention is adapted to be applied to a two-branch space-diversity signal-receiving system having an array of first and second receiver means assigned to a first diversity branch and a second diversity branch, respectively. The method comprises the steps of amplifying a first arrival signal and a second arrival signal to a normalized power level by means of automatic gain control to produce a first branch signal and a second branch signal, respectively, the first arrival signal and the second arrival signal referring to the signals arriving at the first and second receiver means, respectively, represented in a complex expression, producing a first product and a second product, the first product being a product of amplitudes of a first interference signal and a second interference signal multiplied by a phase factor, the second product being a square of the amplitude of the second interference signal, the first and second interference signals being interference signals included in the first and second branch signals, respectively, and the phase factor being $\exp\{i(\phi_1-\phi_2)\}$ with $\phi_1$ and $\phi_2$ denoting phase angles of the first and second interference signals, respectively, producing complex weights $w_1$ and $w_2$ so that the ratio $w_2/w_1$ is equal to the ratio of the first product to the second product, multiplying the first and second branch signals by the complex weights $w_1$ and $w_2$, respectively, to produce a first weighted branch signal and a second weighted branch signal, respectively, performing subtraction of one of the two weighted branch signals from the other in order to compensate the first and second interference signals, and adaptively equalizing the result of the subtraction to produce a decision data signal.

In order to attain the second object above, the apparatus for adaptively canceling an interference signal according to the present invention is directed to being implemented in a two-branch space-diversity signal-receiving system. The apparatus comprises:

first and second amplifier means assigned to a first diversity branch and a second diversity branch, respectively, of the two-branch space-diversity signal-receiving system for amplifying a first arrival signal and a second arrival signal to a normalized power level by means of automatic gain control to produce a first branch signal and a second branch signal, respectively, wherein the first and second arrival signals refer to the signals arriving at the first and second amplifier means, respectively, weight-producing means for producing a first weight and a second weight by which the first and second branch signals, respectively, are to be multiplied, wherein the weight-producing means receives the first and second branch signals and a decision data signal and produces the first and second weights such that the ratio of the second weight to the first weight is equal to the ratio of a first product to a second product, the first product referring to a product of the amplitudes of a first interference signal and a second interference signal multiplied by a phase factor and the second product referring to a square of the amplitude of the second interference signal, the first and second interference signals being interference signals included in the first and second branch signals, respectively, and the phase factor being a factor corresponding to a complex factor $\exp\{i(\phi_1-\phi_2)\}$ with $\phi_1$ and $\phi_2$ denoting phase angles of the first and second interference signals, respectively, multiplier means for multiplying at least one of the first and second branch signals by the corresponding weight to produce a weighted branch signal, subtractor means for performing subtraction between the weighted branch signals, and adaptive equalizer means for adaptively equalizing the output of the subtractor means to produce a decision data signal.

Using the notation defined above, the ratio of the second weight $w_2$ to the first weight $w_1$ is expressed by $$w_2/w_1 = [|m_1 g_1| |J| \cdot |m_2 g_2| |J| \cdot \exp\{i(\phi_1-\phi_2)\}] / (m_2^2 g_2^* g_2 |J|^2) \quad (15)$$

$$= (m_1 g_1 \cdot m_2 g_2^*)/(m_2^2 g_2 g_2^*)$$

and thus $$w_2/w_1 = m_1 g_1/(m_2 g_2). \quad (16)$$

It follows that $$w_1 = k/(m_1 g_1) \quad (17)$$

and $$w_2 = k/(m_2 g_2), \quad (18)$$

k being a proportional constant.

Since weights $w_1$ and $w_2$ are reciprocally proportional to the first and second interference signals $m_1 gJ$, $m_2 gJ$, respectively, the interference signal components included in the first and second weighted branch signals can be compensated through subtraction between the two weighted branch signals.

The above and other objects, features, and advantages of the present invention will become apparent from the following description referring to the accompanying drawings which illustrate an example of a preferred embodiment of the present invention.

BRIEF DESCRIPTION OF THE DRAWINGS

FIG. 2 shows vector diagrams to illustrate the operation of the apparatus shown in FIG. 1.

DETAILED DESCRIPTION OF THE PREFERRED EMBODIMENTS

Figure 1:
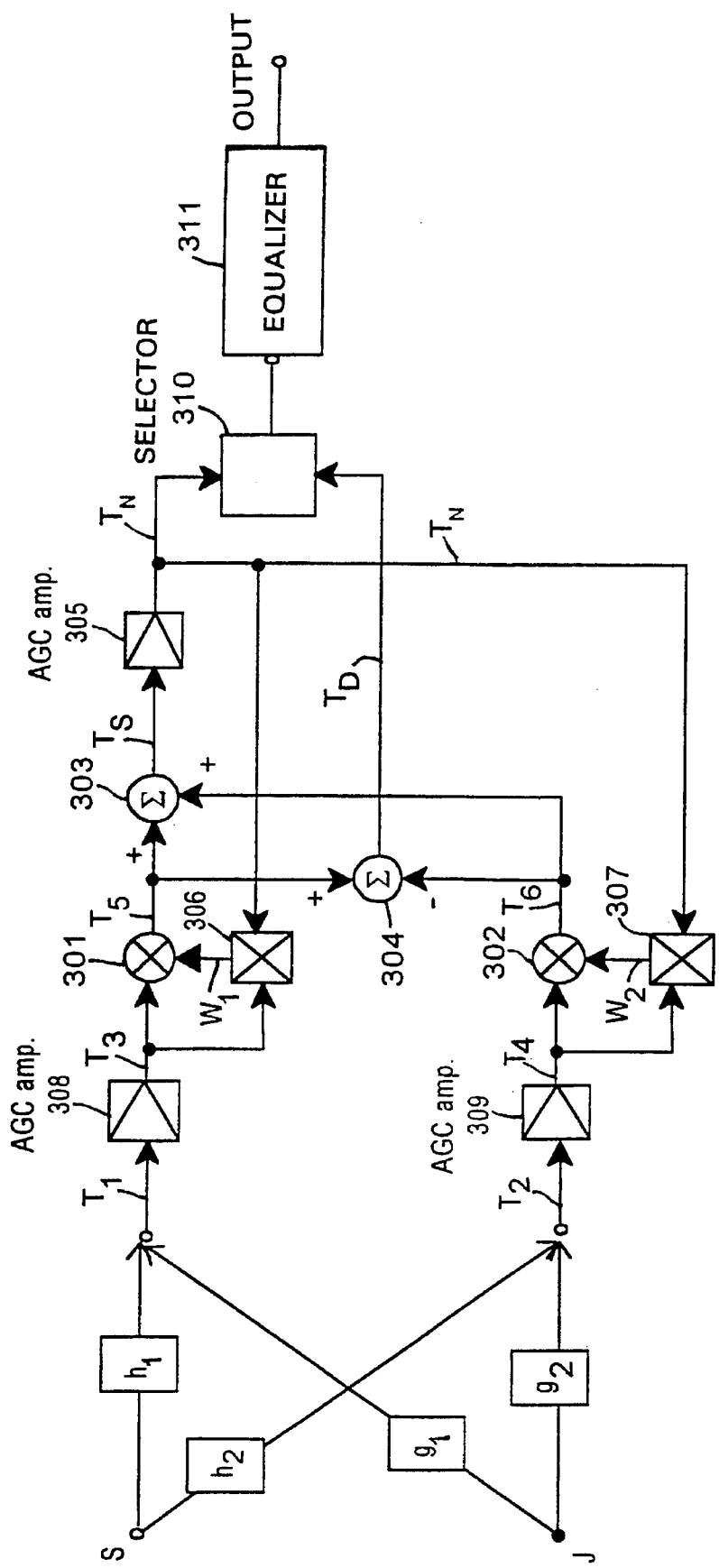
FIG. 1 is a block diagram of a prior art apparatus for adaptively canceling an interference signal.
Figure 3:
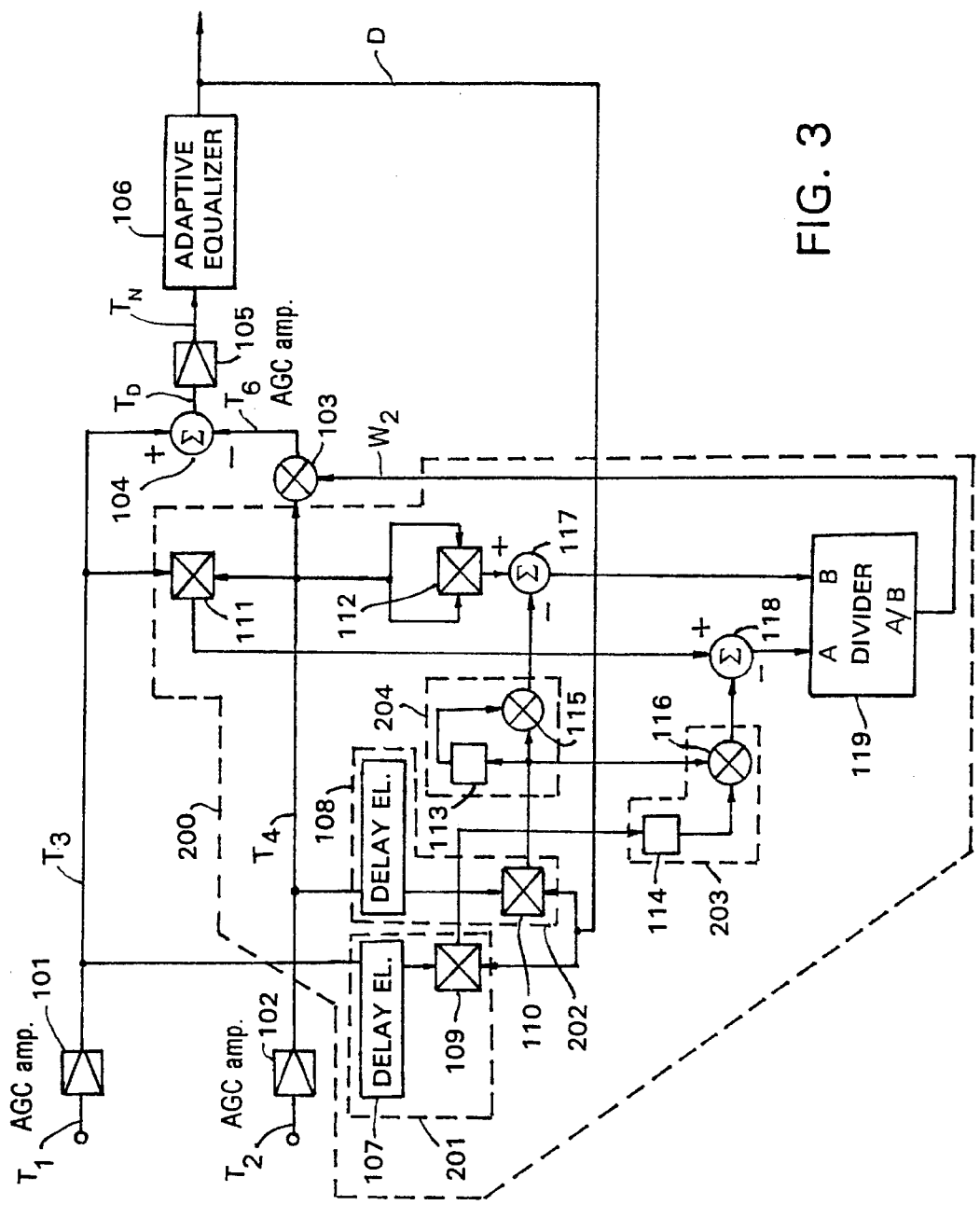
FIG. 3 is a block diagram of an embodiment of the apparatus for adaptively canceling an interference signal according to the present invention.

FIG. 3 is a block diagram of an embodiment of the apparatus for adaptively canceling an interference signal according to the present invention. The embodiment is directed to working the method of adaptively canceling an interference signal for a two-branch space-diversity signal-receiving system.

The apparatus is provided with AGC amplifiers 101, 102, a weight-producing circuit 200, a multiplier 103, a subtractor 104, AGC amplifier 105 and an adaptive equalizer 106. AGC amplifiers 101, 102 are assigned to the first and second diversity branches, respectively, and amplify arrival signals $T_1$, $T_2$, respectively, to a normalized power level by means of automatic gain control to produce branch signals $T_3$, $T_4$, respectively.

The weight producing circuit 200 produces weights or tap coefficients $w_1$, $w_2$. In the present embodiment, $w_1$ is set at 1 and only $w_2$ is produced by this circuit. For this reason, the weight producing circuit 200 produces $m_1 g_1 m_2 g_2^* / (m_2^2 g_2 g_2^*)$ as $w_2$. The multiplier 103 multiplies branch signal $T_4$ by weight $w_2$, thereby producing weighted branch signal $T_6$. It should be noted that, since $w_1$ is set at 1, a multiplier for the other branch is omitted and, as a result, the weighted branch signal for the other branch (the first weighted branch signal) is identical with branch signal $T_3$. The subtractor 104 subtracts weighted branch signal $T_6$ from branch signal $T_3$, thereby producing difference signal $T_D$. AGC amplifier 105 amplifies difference signal $T_D$ to a normalized power level by means of automatic gain control, thereby producing normalized signal $T_N$. The adaptive equalizer 106, having a transversal adaptive filter structure, adaptively equalizes the normalized signal to provide a decision data signal D.

The weight producing circuit 200 is provided with correlators 111 and 112, extractor circuits 201 and 202, conjugate-convertible multipliers 203, 204, subtractors 117, 118 and divider 119. Correlator 111 generates cross correlation coefficient $E_1$ between branch signals $T_3$ and $T_4$ and correlator 112 generates self correlation correlation coefficient $E_2$ of branch signal $T_4$. Extractor circuit 201 extracts from branch signal $T_3$ the signal component corresponding to decision data signal D. Similarly, extractor circuit 202 extracts from branch signal $T_4$ the signal component corresponding to decision data signal D. Conjugate-convertible multiplier circuit 203 produces a product of the outputs of the two extractor circuits 201, 202 after converting the output 10 of extractor circuit 201 into its conjugate complex. Conjugate-convertible multiplier 204 produces a square of the absolute value of the output of extractor circuit 204. Subtractor 118 subtracts the output of conjugate-convertible multiplier 203 from the output of correlator 111, thereby eliminating the term including a signal corresponding to decision data signal D from the cross correlation coefficient between the two branch signals $T_3$ and $T_4$. Similarly, subtractor 117 subtracts the output of conjugate-convertible multiplier 204 from the output of correlator 112, thereby eliminating the term including the signal corresponding to decision data signal D from the self correlation coefficient of the branch signal $T_4$. The divider 119 generates the ratio of the output of subtractor 118 to the output of subtractor 117 and transfers the ratio as weight $w_2$ to multiplier 103.

Extractor circuit 201 is provided with correlator 109 and delay element 107. Correlator 109 generates the correlation coefficient $E_3$ of branch signal $T_3$ with respect to decision data signal D and extracts from branch signal $T_3$ a signal component that is in phase of decision data signal D. Delay element 107 compensates for the delay of decision data signal D relative to branch signal $T_3$, wherein the delay time depends on the tap number of the transversal adaptive filter provided in adaptive equalizer 106. Similarly, extractor circuit 202 is provided with correlator 110 and delay element 108. Correlator 110 extracts from branch signal $T_4$ a signal component that is in phase of decision data signal D. Delay element 108 compensates for the delay of decision data signal relative to branch signal $T_4$. Conjugate-convertible multipliers 203, 204 are respectively provided with conjugate converters 114, 113 and multipliers 116, 115. Each of conjugate converters 114, 113 acts to convert an input signal to its conjugate complex.

In operation, adaptive equalizer 106 provides a normalized desired signal $s = S/\sigma$ to weight-producing circuit 200 by means of non-linear feedback, wherein S and $\sigma$ are the desired signal and the absolute value thereof, respectively, as described above.

As described above, branch signals $T_3$, $T_4$ are $$T_3 = m_1(h_1 S + g_1 J) \quad (19)$$

$$T_4 = m_2(h_2 S + g_2 J), \quad (20)$$

wherein $m_1$, $m_2$ possibly vary in response to changes of the D/U ratios and the levels of the received signal in individual branches. The output of correlator 109 is $$\begin{aligned} E_3 &= E[T_3^* \cdot s] \\ &= m_1 h_1^* \cdot E[S^* \cdot s] \\ &= m_1 h_1^* \sigma \end{aligned} \quad (21)$$

which is a desired signal component included in the branch signal $T_3$, and the output of correlator 110 is $$\begin{aligned} E_4 &= E[T_4^* \cdot s] \\ &= m_2 h_2^* \sigma \end{aligned} \quad (22)$$

which is a desired signal component included in the branch signal $T_4$.

The output of correlator 111 is $$E_1 = E[T_3 \cdot T_4^*] \quad (23)$$
$$= m_1 m_2 (h_1 h_2^* \sigma^2 + g_1 g_2^* \beta^2)$$

and the output of correlator 112 is $$E_2 = e[T_4 \cdot T_4^*] \quad (24)$$
$$= m_2^2 (h_2 h_2^* \sigma^2 + g_2 g_2^* \sigma^2)$$

Multiplier 116 multiplies the output of conjugate converter 114, by producing $$E[T_3^* \cdot s]^* \cdot E[T_4^* \cdot s] = m_1 m_2 h_1 h_2^* \sigma^2, \quad (25)$$

which is a signal to compensate for the desired signal term included in $E_1$, i.e. the first term on the right side of equation (23).

Thus, from equations (23) and (25), the output of subtractor 118 is $$E[T_3 \cdot T_4^*] - E[T_3^* \cdot s]^* \cdot E[T_4^* \cdot s] = m_1 m_2 g_1 g_2^* \beta^2. \quad (26)$$

The output of multiplier 115 is $$E_4^* E_4 = m_2^2 h_2 h_2^* \sigma^2, \quad (27)$$

which is a signal to compensate for the desired signal term included in $E_2$, i.e., the first term on the right side of equation (24).

Thus, the output of subtractor 117 is given from equations (24) and (27), $$E[T_4 \cdot T_4^*] - E[T_4^* \cdot s]^* \cdot E[T_4^* \cdot s] = m_2^2 g_2 g_2^* \beta^2 \quad (28)$$

Therefore, the output of divider 119, i.e., weight $w_2$ is $$w_2 = m_1 m_2 g_1 g_2^* / (m_2^2 g_2 g_2^*). \quad (29)$$

Multiplier 103 multiplies branch signal $T_4$ by $w_2$ to produce weighted branch signal $$T_6 = (m_2 h_2 S + m_2 g_2 J) m_1 m_2 g_1 g_2^* / (m_2^2 g_2 g_2^*). \quad (30)$$

Consequently, the output of subtractor 104 is $$T_D = T_3 - T_6 \quad (31)$$
$$= (m_1 h_1 S + m_1 g_1 J) -$$
$$(m_2 h_2 s + m_2 g_2 J) m_1 m_2 g_1 g_2^* / (m_2^2 g_2 g_2^*)$$
$$= \{ m_1 (h_1 g_2 - h_2 g_1)/g_2 \} S$$

In this way, by supplying the output signal of divider 119 to multiplier 103, canceling of the interference signal is effectively achieved. Although the gains $m_1$, $m_2$ of the AGC amplifiers and the transmission coefficients $g_1$, $g_2$ vary with time, for example by fading, the correlator can operate to track the time-dependent behaviors of the gains and transmission coefficients, because such variations are usually sufficiently slow as compared to the bit rate of the desired signal. For this reason, when any change takes place on the transmission line, the tap coefficient or the weight for canceling a wide-band interference signal can be adaptively provided to the multiplier 103, thereby ensuring interference canceling. Furthermore, because the optimal weight to cancel the interference signal represented in equation (29) can be established regardless of the D/U ratio in the process of determining the weight, the present invention offers the advantage over the power-inversion adaptive array method that an interference signal can be canceled even when the D/U ratio is positive.

In the above embodiment, the coefficient of one branch $w_1$ is set at 1 and the other coefficient $w_2$ is set at the value represented in equation (29). However, it is not always necessary to set the coefficient $w_1$ at 1. The important point is that $w_1$ and $w_2$ satisfy equations (17) and (18).

It is to be understood, however, that although the characteristics and advantages of the present invention have been set forth in the foregoing description, the disclosure is illustrative only, and changes may be made in the arrangement of the parts within the scope of the appended claims.

What is claimed:

1. A method of adaptively canceling an interference signal for a two-branch space-diversity signal-receiving system having an array of first and second receiver means assigned to a first diversity branch and a second diversity branch, respectively, comprising the steps of:

amplifying a first arrival signal and a second arrival signal to a normalized power level by means of automatic gain control to produce a first branch signal and a second branch signal, respectively, the first arrival signal and the second arrival signal referring to the signals arriving at the first and second receiver means, respectively, represented in a complex expression, producing a first product and a second product, the first product being a product of amplitudes of a first interference signal and a second interference signal multiplied by a phase factor expressed in a complex expression, the second product being a square of the amplitude of the second interference signal, the first and second interference signals being interference signals included in the first and second branch signals, respectively, and the phase factor being $\exp\{i (\phi_1 - \phi_2)\}$ with $\phi_1$ and $\phi_2$ denoting phase angles of the first and second interference signals, respectively, producing a complex weight w so that the weight w is equal to the ratio of the first product to the second product, multiplying the second branch signal by the complex weight w to produce a weighted second branch signal, performing subtraction of one of the first branch signal and the weighted second branch signal from the other in order to compensate the first and second interference signals, and adaptively equalizing a result of the subtraction to produce a decision data signal.

2. The method as claimed in claim 1, wherein the step of producing the first product and the second product includes steps of generating a first correlation coefficient representing cross correlation between the first and second branch signals; generating a second correlation coefficient representing self correlation of the second branch signal; and eliminating a term which includes a self correlation coefficient of the desired signal from each of the first and second correlation coefficients, thereby producing the first and second products, the correlation coefficient of any two quantities A and B being defined as a moving average of $A^* \cdot B$ over a time period sufficiently long compared to a transmitted symbol duration of the desired signal so that a stable average value can be produced and sufficiently short compared to a fading duration on a transmission channel so that the correlation coefficient can follow channel fluctuation, and the asterisk representing a complex conjugate.

3. The method as claimed in claim 2, wherein the step of eliminating a term which includes a self correlation coefficient of the desired signal further includes a step of generating a cross correlation coefficient of each of the first and second branch signals with respect to the decision data signal.

4. An apparatus for adaptively canceling an interference signal for a two-branch space-diversity signal-receiving system, comprising:

first and second amplifier means assigned to a first diversity branch and a second diversity branch, respectively, of the two-branch space-diversity signal-receiving system for amplifying a first arrival signal and a second arrival signal to a normalized power level by means of automatic gain control to produce a first branch signal and a second branch signal, respectively, wherein the first and second arrival signals refer to the signals arriving at the first and second amplifier means, respectively, weight-producing means for producing a weight by which the second branch signal is to be multiplied, wherein the weight-producing means receives the first and second branch signals and a decision data signal and produces the weight such that the weight is equal to a ratio of a first product to a second product, the first product referring to a product of the amplitudes of a first interference signal and a second interference signal multiplied by a phase factor expressed in a complex expression, and the second product referring to a square of the amplitude of the second interference signal, the first and second interference signals being interference signals included in the first and second branch signals, respectively, and the phase factor being $\exp\{i(\phi_1-\phi_2)\}$ with $\phi_1$ and $\phi_2$ denoting phase angles of the first and second interference signals, respectively, multiplier means for multiplying the second branch signal by the weight to produce a weighted second branch signal, first subtractor means for performing subtraction between the first branch signal and the weighted second branch signal, and adaptive equalizer means for adaptively equalizing the output of the subtractor means to produce a decision data signal.

5. The apparatus as claimed in claim 4, wherein the weight-producing means is provided with a first correlator means for generating a first correlation coefficient representing cross correlation between the first and second branch signals; a second correlator means for generating a second correlation coefficient representing self correlation of the second branch signal; eliminating means for eliminating a desired-signal term included in each of the first and second correlation coefficients, thereby producing the first and second products; and divider means for dividing the first product by the second product to produce the weight, the correlation coefficient of any two quantities A and B being defined as a moving average of $A^* \cdot B$ over a time period sufficiently long compared to a transmitter symbol duration of the desired signal so that a stable average value can be produced and sufficiently short compared to a facing duration on a transmission channel so that the correlation coefficient can follow channel fluctuation, and the asterisk representing a complex conjugate.

6. The apparatus as claimed in claim 5, wherein the eliminating means includes first extracting means for extracting a desired signal component from the first branch signal; second extracting means for extracting a desired signal component from the second branch signal; first conjugate-convertible multiplier means for multiplying the outputs of first and second extracting means after converting either of the outputs of the first and second extracting means into the conjugate complex thereof so as to generate a signal to compensate for the desired signal term included in the first correlation coefficient; second conjugate-convertible multiplier means for generating from the output of the second extracting means the square of the absolute value thereof; second subtractor means for subtracting the output of the first conjugate-convertible multiplier means from the first correlation coefficient, thereby generating the first product; and third subtractor means for subtracting the output of the second conjugate-convertible multiplier means from the second correlation coefficient, thereby generating the second product.

7. The apparatus as claimed in claim 6, wherein the first extracting means is provided with third correlator means and first delay means, and the second extracting means is provided with the fourth correlator means and second delay means, the first delay means delaying the first branch signal in order to compensate for a delay of the decision data signal with respect to the first branch signal and outputting a first delayed signal to the third correlator means, the second delay means delaying the second branch signal in order to compensate for a delay of the decision data signal with respect to the second branch signal and outputting a second delayed signal to the fourth correlator means, the third correlator means generating a cross correlation coefficient between the first delayed signal and the decision data signal and outputting a third correlation coefficient as the desired signal component extracted from the first branch signal, and the fourth correlator means generating a cross correlation coefficient between the second delayed signal and the decision data signal and outputting a fourth correlation coefficient as the desired signal component extracted from the second branch signal.

8. The apparatus as claimed in claim 5, wherein the divider means supplies an output thereof, such as the weight, to the multiplier means for multiplying the second branch signal by the weight to produce the weighted second branch signal.

\* \* \* \* \*